United States Patent
Giese, deceased

[11] 3,904,174
[45] Sept. 9, 1975

[54] WEB TIP SEAT CUP

[75] Inventor: Elroy J. Giese, deceased, late of Cleveland, Ohio, by Alice Giese, executrix

[73] Assignee: Tomlinson Industries, Inc., Cleveland, Ohio

[22] Filed: Oct. 25, 1972

[21] Appl. No.: 300,450

[52] U.S. Cl............ 251/331; 251/333; 251/335 A; 251/251
[51] Int. Cl........................ F16k 23/00; F16k 7/00
[58] Field of Search ....... 251/331, 175, 333, 335 A, 251/251

[56] References Cited
UNITED STATES PATENTS

| | | | |
|---|---|---|---|
| 1,939,911 | 12/1933 | McCune | 251/335 A |
| 2,710,594 | 6/1955 | Thompson | 251/333 X |
| 3,207,472 | 9/1965 | Seltsam | 251/331 |

FOREIGN PATENTS OR APPLICATIONS

| | | | |
|---|---|---|---|
| 1,141,078 | 3/1957 | France | 251/331 |
| 580,166 | 7/1959 | Canada | 251/333 |
| 489,506 | 12/1954 | Italy | 251/335 A |

*Primary Examiner*—Arnold Rosenthal
*Attorney, Agent, or Firm*—Fay & Sharpe

[57] ABSTRACT

The specification and drawings disclose valve assemblies of the type often used for dispensing liquid foods and beverages. The disclosed valves each comprise a valve or nozzle body including a cylindrical valve chamber connected with a lateral inlet passage and an axial outlet passage. A valve seat is formed in the chamber about the outlet passage. In one of the embodiments, the seat is in the form of a flat shoulder located circumferentially about the outlet. In a second embodiment, the seat is a curved transition surface between the outlet passage and the cylindrical a valve chamber. In both embodiments valve element in the form of a resilient cup member is carried at the end of a rigid stem and adapted to engage the seat. The stem and the cup member are continually spring biased toward the seat by a compression spring which acts between the valve member and a bonnet screwed to the top of the valve body. Movement of the valve member between opened and closed positions is accomplished through a manual handle connected pivotally to the upper end of the stem and having camming surfaces which engage the top of the bonnet. The valve element is formed so that the lower or sealing end includes a peripheral, downwardly extending flange or web of tapered cross-section terminating in a relatively narrow, circumferentially continuous band. The resilient web serves to overcome problems which tolerance stacking imparts in the assembly and provides excellent sealing with both types of seats.

5 Claims, 7 Drawing Figures

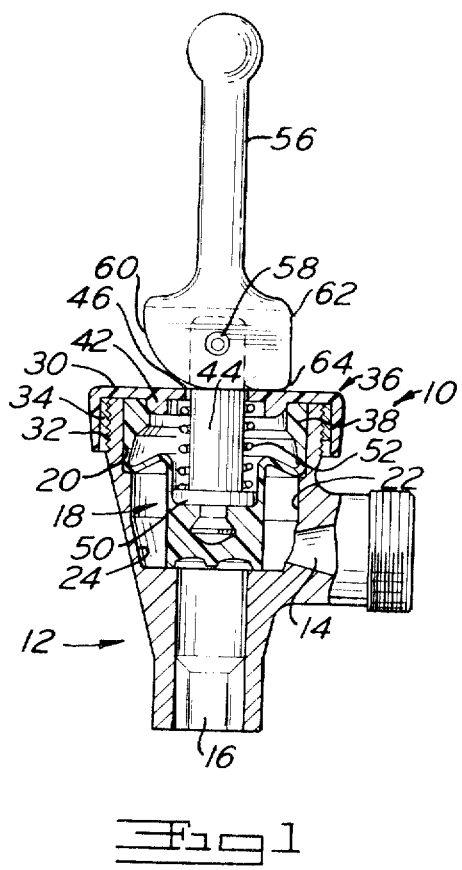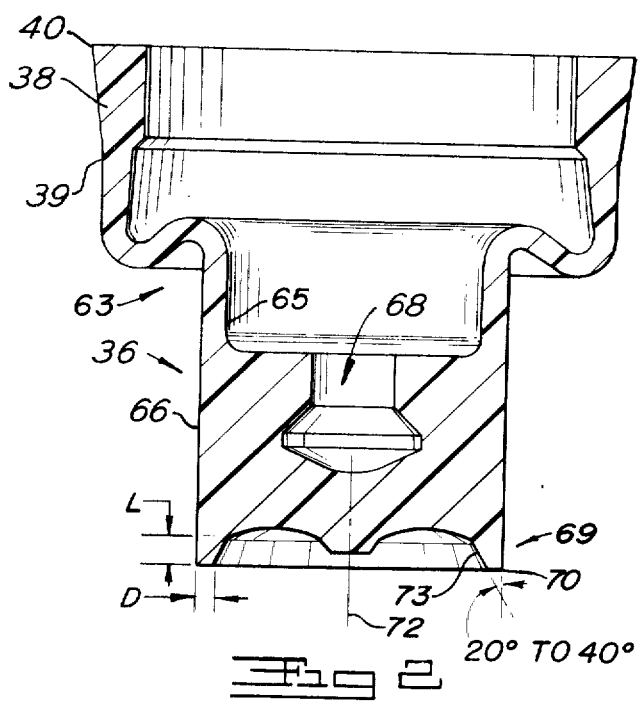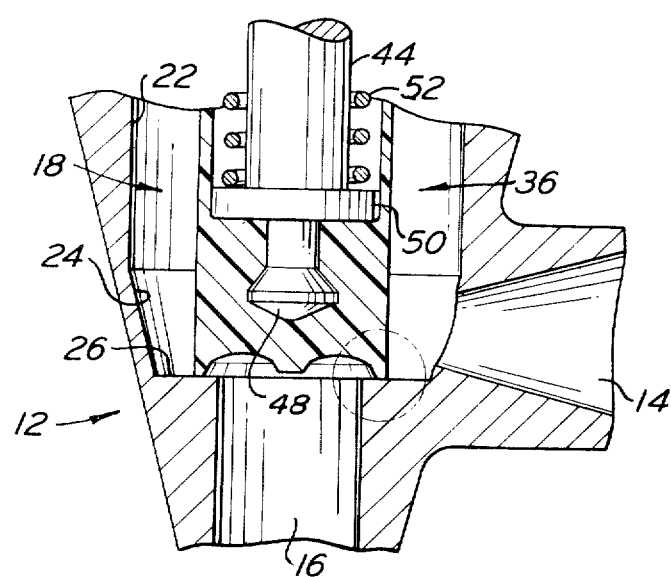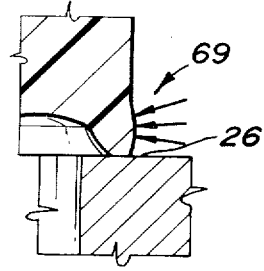

WEB TIP SEAT CUP

The subject invention is directed toward the valve art and, more particularly, to a valve having an improved sealing means of the type generally referred to as a seat cup.

A valve that has proved especially suited for dispensing liquid foods comprises a valve body having a cylindrical valve chamber connected with a lateral inlet passage and an axial outlet passage or nozzle. The outlet passage is of a lesser diameter than the valve chamber so that the bottom of the valve chamber defines an annular seat about the outlet. Flow from the valve chamber is controlled by a resilient, elastomeric seat cup member carried at the end of a rigid stem. The cup has a lower, generally flat face sized to engage the annular seat. Typically, the stem extends outwardly through a bonnet screwed to the body and both the stem and the seat cup are continually spring biased toward the seat by a spring positioned between the bonnet and the seat cup. The valve is operated to an open position by a manual actuating handle having cam surfaces which ride on the top of the bonnet. Valves of this general type are shown, for example, in U.S. Pat. Nos. 3,104,089 and 3,246,872.

In order to insure that a good seal is always obtained between the seat and the seat cup, even when tolerances stack up in the negative direction, it has been the practice to make the stems slightly longer than actually necessary. Thus, when the bonnet is screwed down on the body, the extra stem length assures that firm contact will result between the seat cup and the seat.

Sometimes, because of tolerance stacking in the positive direction, the relative length of the stem can be so great that the cam surfaces are driven out of contact with the bonnet. Although the valve is still entirely operable and generally satisfactory, the handle is loose and floppy when the valve is in the closed position.

The subject invention provides a seat cup which overcomes the noted problem while simultaneously substantially increasing the pressure holding ability of the valve. Specifically, the invention contemplates that a valve of the type described will have a seat cup in which the lower or sealing end, rather than being flat and/or solid, will comprise a peripheral, downwardly extending flange of tapered cross-section terminating in a relatively narrow, circumferentially continuous band. This, in effect, provides a sealing web which can yield to take up the excess stem length without driving the cam tracks off of the bonnet. Moreover, not only is the problem with tolerance stacking overcome, but the valve is capable of sealing much higher pressures. Tests have shown that with the improved seat cup, the valve is able to hold pressures up to 80 psi and higher. The reason for the increased holding abililty is not clearly understood but is believed to result from a type of lip seal action plus the fact that the sealing force is concentrated over a smaller area thus resulting in a higher sealing pressure. Whatever the reason, the improved sealing ability is unexpected.

In addition to the improved sealing action provided by the seat cup when used in a valve body of the type having a conventional flat seat, the cup can also be used in conjunction with a modified valve body having a larger diameter outlet and a seat which comprises a convex transition surface between the outlet and the cylindrical valve chamber. The outlet can be of substantially larger diameter than with the standard flat seat and in combination with the convex transition surface greatly reduced pressure drop and increased flow result. In this arrangement the circumferential side wall of the web of the cup member engages the convex transition surface for sealing.

Accordingly, a primary object is the provision of a seat cup construction which provides increased sealing ability in conventional valves of the type described and which can also be used in a modified valve body to provide lower pressure drop and increased flow.

A further object of the invention is the provision of an improved valve of the type described wherein problems with tolerance stacking are overcome.

Another object is the provision of a seat cup wherein the sealing member constitutes a tapered, annular web capable of sealing against relatively high pressures.

A still further object of the invention is the provision of a valve having a seat cup which is simple to make and highly reliable. Another object is the provision of a valve cup and seat combination which allows increased flow through the valve.

The above and other objects and advantages will become apparent from the following description when read in conjunction with the accompanying drawings wherein:

FIG. 1 is a partial cross-sectioanal view of a valve-faucet assembly having a conventional body and incorporating an improved seat cup formed in accordance with the preferred embodiment of the invention;

FIG. 2 is an enlarged cross-sectional view of the seat cup;

FIG. 3 is an enlarged view of the valve chamber of the valve-faucet assembly of FIG. 1 showing the valve in a closed position;

FIG. 4 is an enlarged view of the circled area of FIG. 3;

Figure 5:
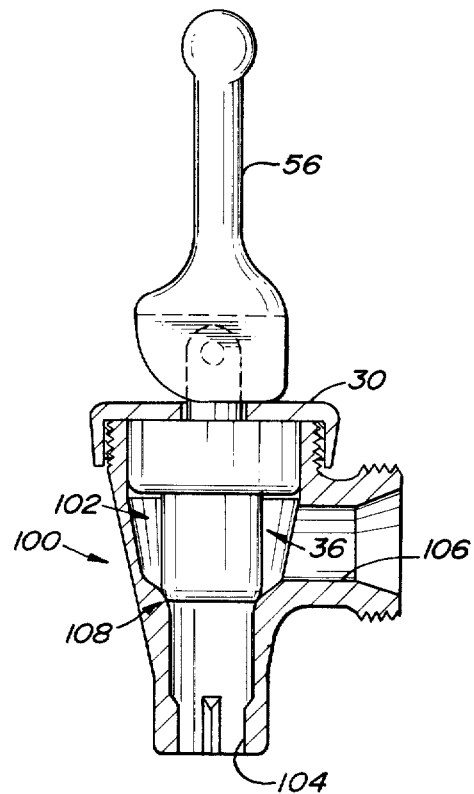
FIG. 5 is a cross-sectional view similar to FIG. 1 but showing the improved seat cup in a modified valve body.

Referring in particular to FIG. 1 which, as previously mentioned is a partial cross-sectional view through a valve-facet assembly 10 which embodies the invention, it will be seen that the assembly includes a conventional body 12 having an inlet passage 14 and an outlet passage 16. In the embodiment shown, the body 12 is a onepiece casting or the like; however, it should be appreciated that it could take many forms and be made from a variety of materials. Extending inwardly from the upper end of the body 12 (as viewed in FIG. 1) is a generally cylindrical bore 18 which defines a valve chamber which interconnects passages 14 and 16. The bore 18 is shown as being of stepped diameter having a first relatively large diameter section 20, an intermediate section 22 and a slightly tapered lower section 24. The bottom wall of bore 18 defines a flat annular shoulder 26 about the outlet passage 16. In the subject device, the annular shoulder 26 serves an integral on valve seat; however, the seat could be a separate, replaceable member, if desired.

Closing the upper end of the bore 18 is a cap or bonnet member 30 which is threadedly connected to external threads 32 formed about the upper end of the body. In the embodiment shown, the bonnet member 30 is formed from molded plastic and has a threaded metal ring 34 carried therein for cooperation with threads 32.

Positioned within the valve chamber and adapted to be moved vertically within the valve chamber is a seat cup-type valving member 36 which will subsequently be described in great detail. However, for present purposes, it is sufficient to note that the cup is formed from a resilient elastomeric material such as siliconeelastomer having a durometer hardness in the range of from about 30 to 60 points. The seat cup has an upper, generally cylindrical section 38 having an outer diameter that tapers from a diameter at point 39, substantially equal to the diameter of section 20 of bore 18, to a somewhat larger diameter at point 40. The cup member is positioned in the bore 18 as shown in FIG. 1. In this position, the cylindrical portion 38 seals tightly against the section 20 of bore 18. Further, the bonnet member 30 has an inwardly extending flange 42 which engages about the inner periphery of the cylindrical portion 38 and the bore section 20 by expanding the upper end of the seat cup into tight engagement with the wall.

Actuation of the seat cup between the opened and closed positions is accomplished by an elongated, rigid stem member 44 which extends inwardly through a slightly larger opening 46 formed in bonnet member 30. The lower end of stem 44 is provided with a knob-like portion 48 which is received in a corresponding opening formed in the seat cup. Additionally, an enlarged flange section 50 bears against the interior of the seat cup. Both the stem and the seat cup are continually biased in a downwardly direction toward the shoulder 26 by a compression spring 52 which bears against the upper surface of flange 50 and the under surface of the bonnet member 30.

The valve is actuated to its open position by a manually operable handle 56. Many other types of operating mechanisms could be provided but, in the preferred embodiment, the lower end of handle 56 is bifurcated and receives the upper end of the stem 44 between the bifurcations. A pin or the like 58 extends through the bifurcations and pivotally connects with the stem. It should be noted that the bifurcated end portions of the handle 56 are provided with a cam contour (shown in FIG. 1). The section 60 of the cam contour is designed so that as the handle is pulled to the left, the stem is cammed upwardly, opening the valve. When released, the compression spring causes the valve to close. The opposite or right-hand end of the cam section identified with the numeral 62 is designed so that when the operating handle 56 is moved in a clockwise direction (as shown in FIG. 1), the valve will be moved to its open position with the surface 62 engaging the top surface of the bonnet 30. In this position, the handle can be released and the valve will remain in the open position. Thereafter, to close the valve, the handle must be actuated counter-clockwise (as shown in FIG. 1) at least to the point where the pivot pin 58 is on the left side of the corner 64. At this time, the compression spring will again move the valve to the closed position. This particular handle configuration is more fully described in U.S. Pat. No. 3,246,872 and forms no part of the present invention.

As previously mentioned, during manufacture of the valve-faucet assemblies of the type shown in FIG. 1, it has been the practice to make the stem 44 slightly longer than actually required so that tight seating of the valve cup is assured even when the tolerance variations stack up in the negative direction. For example, assume that the depth of the bore 18 were slightly long, the valve cup were slightly short, and the bonnet member were too thick or did not thread down onto the body to the extent desired. In such instances, the seat cup would not be in tight engagement with the seat shoulder 26 in the valve-closed position. In the past, this has been overcome by making the stem of a length slightly greater than actually required. This assured tight engagement of the seat and cup under all conditions. One problem which resulted from this however, was that when the tolerance variations stacked up in the opposite direction, the relative length of the stem was such that the cam track portion of the valve handle was driven upwardly a slight distance off the top of the bonnet member when the valve was in the off position. This permitted the valve handle to have some slight flop. This was, of course, undesirable.

The manner in which the subject invention overcomes the problem and provides an improved seal is best understood by reference to FIGS. 2 and 3. As shown, the seat cup 36 includes a transverse shoulder portion 63 which, in the subject embodiment, is a preflexed reverse bend-type shoulder described and claimed in U.S. Pat. No. 3,246,872. The shoulder portion 63 is connected through a cylindrical, relatively thin walled section 65 with a base portion 66 of cylindrical shape and provided with the stem end receiving opening 68. The opening 68 is contoured substantially identically with the end portion 48 of stem 44. The stem is inserted in the opening 68 merely by deforming the resilient cup sufficiently to allow the enlarged end portion to enter the opening.

Of particular importance to the cup seat 36 is the arrangement of the lower or sealing end of the member. As shown, a peripheral flange or web-like section 69 is formed on the lower end of the cylindrical section 68. The web section 69 preferably extends downwardly with the same outer diameter as the main body of section 66 and terminates in a sharp lower corner 70. An annular sealing web or band of a width D extends circumferentially about the lower end of the web and preferably is substantially perpendicular to the center axis 72 of the cup seat. The inner wall 73 of web 69 is tapered at an angle preferably in the range of 20° to 40° relative to the outer wall. In the embodiment under consideration, the inner wall 73 is tapered at an angle of approximately 30°. Additionally, the web 69 has a length L equal to approximately 1/10 of its outer diameter. It should be appreciated however, that the various angles and dimensions given could vary somewhat from that shown.

The functioning of the web portion 69 in the conventional body can best be understood by reference in FIGS. 3 and 4. Specifically, assume in FIG. 3 that the stem 44 is overly long. The resilient nature of the web portion 69 allows it to compress slightly under the influence of the compression spring 52 when the valve is in the closed position. This causes the handle to be held with its cam track firmly in engagement with the top surface of the bonnet member 30. This is so even though the stem is longer than actually required. This is in contrast to the prior type of solid, generally flat end on the seal cups which could not be compressed sufficiently by the spring to maintain the handle in engagement with the bonnet when the stem was slightly longer than required. Not only does the lower end compress but, because of its configuration when compressed, it assumes the shape generally shown in FIG. 4. Note that it tends to bulge radially outwardly a slight amount. Additionally, a relatively high sealing pressure occurs between the sealing band D and the seat 26. When fluid pressure acts against the outer circumference of the web, it, of course, effectively acts perpendicularly to a tangent point on the surface. As can be seen in FIG. 4, this attempts to straighten the flange or web section 69 from its deformed position. As a consequence, the fluid pressure acting against the web is believed to further increase the sealing pressure between the sealing band and the seal. The combination of the somewhat lip-like seal and the increased sealing pressure allows the valve to hold against fluid pressures of 80 psi and higher. Moreover, in contradistinction to a typical lip-type seal, it should be noted that the outer corner 70 is not placed under any substantial circumferential extension and accordingly, failure at this point is extremely unlikely.

Figure 7:
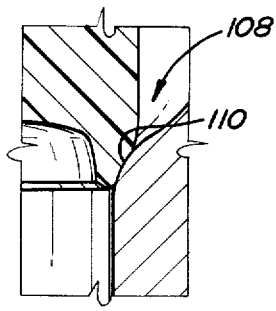
FIG. 7 is an enlarged view of the circled area of FIG. 6.
Figure 6:
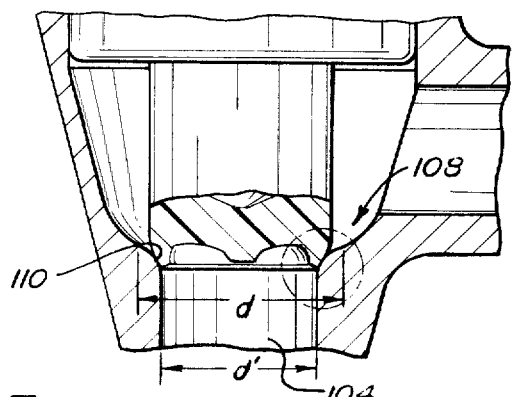
FIG. 6 is an enlarged view of the valve chamber of the FIG. 5 embodiment.

FIGS. 5 through 7 show a second embodiment of the invention which utilizes the seat cup unit of FIG. 2 but combines it with a modified valve body and seat arrangement to permit higher flow rates. Although the operating handle and stem could vary substantially, they are disclosed as identical with the FIGS. 1 through 4 embodiment. Accordingly, the various components of the handle and stem assembly have been identified with the same reference numerals and reference may be had to the description of the FIG. 1 embodiment for an understanding of the functioning of these components.

The differences between the FIGS. 5 through 7 embodiment and the FIGS. 1 through 4 embodiment reside in the relationship between the seat cup, the valve chamber, and the seat shape. As shown, the body 100 has a generally conically shaped valve chamber 102 which is axially aligned with the outlet or discharge opening 104. For reasons which will subsequently be explained, the discharge opening 104 of this embodiment can be substantially larger in diameter than the discharge opening 16 of the FIGS. 1 through 4 embodiment. Additionally, the inlet opening 106 is also of larger diameter and extends laterally into the body generally perpendicular to the axis of the outlet opening. The seat 108 in this embodiment is formed by a convex transition surface 110 located generally at the juncture between the valve chamber 102 and the discharge 104. The diameter of the seat cup member 36 relative to the outlet opening 104 and seat 108 can best be seen in FIG. 6. Note that the total outside diameter of the seat cup is slightly larger than the discharge 104 but somewhat smaller than the maximum diameter d of the transition surface 110.

In the embodiment under consideration the transition surface 110 is approximately a one-quarter round and the circumferential lower edge of the seat cup engages approximately one-half the distance between the inner diameter d' and the maximum outer diameter d of the surface.

When the handle is moved to the position wherein the seat cup is in its lower or "off" position, the convex surface 110 circumferentially engages and compresses the web portion of seat cup in the manner shown in FIG. 7. A seal is thus formed about the perphery of the seat cup rather than on its end wall as in the FIGS. 1 through 4 embodiment. With this arrangement, the seat cup automatically finds its own level along the length of the seat. Thus, variations in dimensions due to tolerance stacking is automatically compensated for and the outlet diameter can be substantially increased.

The dimensions of the seat cup and seat surface are preferably selected so that at the time the seat cup establishes initial line contact with the convex seat defining surface 110, the stem is not yet fully extended into the body. The biasing force of the spring 52 is thus permitted to act on the stem to force the stem to follow through after initial line contact to move the seat cup into firm sealing engagement with the seat. It has been found that this arrangement allows the valve to close off against higher pressures than had previously been possible to handle. It should be noted that the combination of the flexible web and the spherically convex surface 110 permit substantial longitudinal variations in the relative positions of the seat and the seat cup while still maintaining a high pressure seal. This is in contradistinction to the known conical seat and conical seat cup arrangement which have an abrupt engagement and wherein slight variations in relative longitudinal positioning result in drastic variations in sealing pressure.

What is claimed is:
1. A valve comprising:
    a valve body having a cylindrical valve chamber connected with a lateral inlet passage and an axial outlet passage;
    a valve seat formed in said chamber about said outlet passage;
    a stem member extending generally axially into said valve chamber;
    a resilient generally cup-shaped valve member positioned in said valve chamber and having an end face adapted to engage in said valve chamber and having an end face adapted to engage said seat and a peripheral side wall sealingly engaged with the inner wall of said chamber at a location axially spaced from said inlet, the end of said valve member including a sealing portion in the form of a resilient peripheral downwardly extending flange of tapered cross-section terminating in a relatively narrow circumferentially continuous band, said sealing portion adapted to engage said seat about said outlet, said flange being defined by inner and outer walls with the outer wall being cylindrical and having its longitudinal axis substantially parallel to the axis of said valve chamber and said inner wall being inclined at an angle in the range of approximately 20° to 60° relative to the axis of said chamber; and,
    wherein said seat comprises a convex surface which engages said sealing portion circumferentially about said flange.
2. The valve as defined in claim 1 including means for moving said valve member between an opened and a closed position and means for continuously biasing said valve member toward said valve seat and wherein said flange is of a length such that when it is in a closed position said flange is in a compressed condition.
3. The valve as defined in claim 1 wherein said inner wall is inclined relative to said outer wall at an angle of greater than 10°.
4. The valve as defined in claim 1 wherein the length of said flange is less than the diameter of said valve member.
5. The valve as defined in claim 1 wherein said flange is formed integrally with said valve member.

* * * * *